United States Patent
Singh et al.

(10) Patent No.: US 10,553,853 B2
(45) Date of Patent: Feb. 4, 2020

(54) FLEXIBLE COMPOSITE ELECTRODE HIGH-RATE PERFORMANCE LITHIUM-ION BATTERIES

(71) Applicant: Kansas State University Research Foundation, Manhattan, KS (US)

(72) Inventors: Gurpreet Singh, Manhattan, KS (US); Lamuel David, Knoxville, TN (US); Romil Bhandavat, Beaverton, OR (US)

(73) Assignee: Kansas State University Research Foundation, Manhattan, KS (US)

( * ) Notice: Subject to any disclaimer, the term of this patent is extended or adjusted under 35 U.S.C. 154(b) by 763 days.

(21) Appl. No.: 14/778,221

(22) PCT Filed: Mar. 20, 2014

(86) PCT No.: PCT/US2014/031351
§ 371 (c)(1),
(2) Date: Sep. 18, 2015

(87) PCT Pub. No.: WO2014/153465
PCT Pub. Date: Sep. 25, 2014

(65) Prior Publication Data
US 2016/0056451 A1    Feb. 25, 2016

Related U.S. Application Data

(60) Provisional application No. 61/803,680, filed on Mar. 20, 2013, provisional application No. 61/817,626, filed on Apr. 30, 2013.

(51) Int. Cl.
*H01M 4/133* (2010.01)
*H01M 10/0525* (2010.01)
*H01M 4/1393* (2010.01)
*H01M 4/136* (2010.01)
*H01M 4/58* (2010.01)
*H01M 4/131* (2010.01)
*H01M 4/1391* (2010.01)
(Continued)

(52) U.S. Cl.
CPC ........... *H01M 4/133* (2013.01); *H01M 4/131* (2013.01); *H01M 4/136* (2013.01);
(Continued)

(58) Field of Classification Search
None
See application file for complete search history.

(56) References Cited

U.S. PATENT DOCUMENTS 8,110,026 B2    2/2012  Prud'Homme et al.
2010/0021819 A1    1/2010  Zhamu et al.
(Continued)

FOREIGN PATENT DOCUMENTS

WO    WO 2011/013851    *    2/2011    ............. H01G 11/30

OTHER PUBLICATIONS

The International Search Report and Written Opinion dated Aug. 22, 2014, in PCT/US14/31351, filed Mar. 20, 2014.

*Primary Examiner* — Jeremiah R Smith
(74) *Attorney, Agent, or Firm* — Hovey Williams LLP (57) ABSTRACT

A composite material comprising graphene or reduced graphene oxide and a polymer-derived ceramic material, such as SiOC, is provided. The composite materials can be used to construct anodes (16), which can be used in batteries (10), particularly lithium ion batteries. The anodes exhibit relatively high charge capacities at various current densities. Moreover, the charge capacity of the anodes appears exceptionally stable even after numerous charging cycles, even at high current densities.

27 Claims, 3 Drawing Sheets

(51) Int. Cl.
 H01M 4/36 (2006.01)
 H01M 4/48 (2010.01)
 H01M 4/587 (2010.01)
 H01M 10/058 (2010.01)
 H01M 4/02 (2006.01)

(52) U.S. Cl.
 CPC ....... H01M 4/1391 (2013.01); H01M 4/1393 (2013.01); H01M 4/364 (2013.01); H01M 4/366 (2013.01); H01M 4/48 (2013.01); H01M 4/58 (2013.01); H01M 4/587 (2013.01); H01M 10/058 (2013.01); H01M 10/0525 (2013.01); *H01M 2004/027* (2013.01); *H01M 2220/20* (2013.01)

(56) References Cited

U.S. PATENT DOCUMENTS

| | | | |
|---|---|---|---|
| 2011/0284805 A1 | 11/2011 | Samulsli et al. | |
| 2012/0064409 A1* | 3/2012 | Zhamu | B82Y 30/00 429/221 |
| 2012/0121981 A1 | 5/2012 | Harimoto et al. | |
| 2012/0142832 A1 | 6/2012 | Varma et al. | |
| 2012/0177995 A1 | 7/2012 | Sun et al. | |
| 2013/0252106 A1* | 9/2013 | Numata | H01M 4/485 429/220 |
| 2014/0004412 A1* | 1/2014 | Ogino | H01M 4/405 429/199 |
| 2014/0050977 A1* | 2/2014 | Sanada | H01M 4/04 429/211 |
| 2014/0170486 A1* | 6/2014 | Matsumura | H01M 4/13 429/211 |
| 2014/0205904 A1* | 7/2014 | Sasaki | H01M 4/622 429/217 |
| 2014/0212760 A1* | 7/2014 | Zhao | H01M 4/583 429/231.8 |
| 2015/0044559 A1* | 2/2015 | Toyoda | H01M 4/13 429/217 |

* cited by examiner

FLEXIBLE COMPOSITE ELECTRODE HIGH-RATE PERFORMANCE LITHIUM-ION BATTERIES

RELATED APPLICATIONS

This application is a national stage application under 35 U.S.C. § 371 of International Application No. PCT/US14/31351, filed Mar. 20, 2014, which claims the benefit of U.S. Provisional Patent Application No. 61/803,680, filed Mar. 20, 2013, and U.S. Provisional Patent Application No. 61/817,626, filed Apr. 30, 2013, all of which are incorporated by reference herein in their entireties.

BACKGROUND OF THE INVENTION

Field of the Invention

The present invention is generally directed toward a composite material comprising graphene or reduced graphene oxide and a polymer-derived ceramic material. The composite materials according to the present invention can be used to construct anodes, which can be used in batteries, particularly lithium ion batteries.

Description of the Prior Art

Rechargeable lithium ion batteries (LIBs) have been in use since the early 1990s for the powering of portable electronic devices that required low self-discharge, less maintenance, high operating voltage and high-energy density. However, the growing popularity of LIBs in the area of battery powered vehicles, intermittent storage in power grids and aerospace applications have gradually pushed the LIB operating requirements to higher cyclic efficiency, high power density, high specific capacity, and sustained capacity at higher cycling rates. The capacity of a LIB is theoretically limited by the electrode materials used. Typically, the anode and cathode are graphite (~372 $mAhg^{-1}$) and $LiCoO_2$ (~140 $mAhg^{-1}$). To date, the most commonly used anode material in LIBs is graphite due to its stable cycleability, high coulombic efficiency, and structural stability. But the drawbacks such as low reversible capacity and poor capacity retention at higher operating current densities have fueled the research of designing an anode material superior to graphite.

To this end, certain silicon-containing composite anodes have shown great promise. Recent research has shown considerable improvements in cycling performance for Si-coated carbon nanotubes, thin films, Si/C core/shell composites, and polymer-derived SiOC ceramics for negative electrodes. Of various silicon-based anode architectures, polymer-derived SiOC is perhaps the most unique and the least studied anode material in this class. SiOC is a high temperature glass-ceramic with an open polymer-like network structure consisting of mixed bonds of Si with 0 and C atoms. This ceramic has a weight density of 2.1 g/cc, which is two thirds that of SiC or $SiO_2$ crystalline phases. This open structure enables high charge and discharge rates with higher gravimetric capacity than graphite. However, much like other anode materials, SiOC anode preparation involves mixing with conducting agents and binders (ratio 8:1:1), followed by slurry coating on a Cu current collector foil before use as a battery electrode.

In this context, the graphene-based multi-component composite anodes are an attractive alternative primarily because of larger interlayer spacing in restacked graphene, high surface area, high electronic conductivity, and its ability to be readily interfaced with lithium active redox components, such as germanium/silicon nanoparticles or transition metal oxides like $MoS_2$, $SnO_2$, $TiO_2$, and $Fe_3O_4$, to generate anodes that are inherently conducting, mechanically robust, and exhibiting high lithium intercalation capacity and rate capability. These porous anodes offer advantages over the traditional anodes in terms their ability to accommodate large strains associated with continued Li cycling and elimination of the dead weight of copper current collector, which accounts for approximately 10% of the total battery weight. Weight of the battery anode can be further reduced by another 20% by elimination of non-active phases such as polymeric binders and conducting agents.

However, the aforementioned graphene paper-based anodes do not offer a complete solution. They are either (a) too thin (sub-micron), which may limit the overall battery capacity due to insufficient active mass, or (b) require expensive synthesis techniques. More importantly, these anodes generally show very high first cycle loss (as much as 50%), low cycling efficiency (95 to 98%) and also poor capacity retention at high current densities (damage at high C-rates), making them impractical for use in a Li-ion battery fuel cell.

SUMMARY OF THE INVENTION

According to one embodiment of the present invention there is provided a composition comprising either graphene or reduced graphene oxide and a polymer-derived ceramic material. These composite compositions may be used to form electrodes, and particularly anodes, that may be used in a variety of battery applications.

In another embodiment of the present invention there is provided a process for producing the aforementioned composite compositions. In particular embodiments, the composites may be fabricated by simply mixing together graphene particles and particles of a polymer-derived ceramic material. In other embodiments, particularly those comprising reduced graphene oxide, the process begins by mixing graphene oxide particles with particles of a polymer-derived ceramic material to form a composition precursor material. The precursor material is then heated in order to thermally reduce at least a portion of the graphene oxide contained therein to form the composite composition.

BRIEF DESCRIPTION OF THE DRAWINGS

FIGS. 2(a), (b), (d), (e), (g), (h), (j) and (k) are SEM images of rGO and rGO/SiOC composites made according to embodiments of the present invention; and FIGS. 2(c), (f), (i), and (l) are TEM images and SAED patterns (inserts) of rGO and rGO/SiOC composites according to embodiments of the present invention.

DETAILED DESCRIPTION OF THE PREFERRED EMBODIMENT

The present invention provides composite materials that are particularly suited for use in forming anodes for battery applications, especially lithium ion batteries ("LIBs"). The composite materials generally comprise, consist of, or consist essentially of graphene or reduced graphene oxide and a polymer-derived ceramic component.

As used herein, the term "graphene" is understood to mean a pristine or unmodified form of graphitic carbon, comprising polycyclic aromatic molecules of carbon atoms covalently bonded to each other. The covalently bonded carbon atoms may form a 6-membered ring as a repeating unit, or may further include a 5-membered ring and/or a 7-membered ring. Thus, the graphene appears as a single layer of covalently bonded carbon atoms (usually, bonded via a $sp^2$ bond). The graphene may have various structures that vary according to the number of 5-membered rings and/or 7-membered rings present. The graphene may be formed as a single layer of graphene. Alternatively, the graphene may be formed as multiple layers of mono-layer graphene sheets stacked upon one another. In this regard, the graphene may have a maximum thickness of 100 below nm. Generally, the side ends of the graphene are saturated with hydrogen atoms. In one embodiment, the graphene may be produced via exfoliation of graphite into mono-layered or very think multilayered sheets.

The term "graphene oxide" used herein refers to an oxide prepared by oxidizing graphite and thus is understood to include graphite oxide. The graphene oxide has a structure in which a carbon layer includes an oxygen-containing group such as a hydroxyl group, an epoxide group, a carboxyl group, or a ketone group. The graphene oxide is distinguished from graphite since the graphene oxide can be dispersed in a solution, and thus can be formed as a thin layer. Thus, when the graphene oxide is formed as a thin film by using the graphene oxide dispersion solution and the thin film is then reduced, reduced graphene oxide in the form of a sheet may be formed. The acronym "rGO" used herein indicates a compound prepared by reducing the graphene oxide.

The term "reduced graphene oxide" or "rGO" refers to a graphene oxide-based material in which oxyfunctional groups have been almost entirely removed from the graphenic molecular structure. Thus, rGO has qualities and physical properties approaching those of pristine graphene, but is not completely identical due to the presence of residual oxyfunctional groups. For example, rGO has decreased conductivity as compared with graphene. The rGO does not have a full graphene structure (C═C/C—C conjugated structure) and has less C═C bonds than graphene. In other words, since oxygen atoms or nitrogen atoms are partially mixed between carbon atoms, the rGO has various band-gaps.

In certain embodiments, the polymer-derived ceramic material is amorphous and comprises a member selected from the group consisting of SiOC, SiCN, SiBCN, SiBCO, SiAlCN, or combinations thereof. Of these, SiOC (silicon oxycarbide) is a preferred ceramic material. The ceramic material may be synthesized via a polymer pyrolysis route. For example, SiOC can be produced by reacting liquid 1,3,5,7-tetramethyl-1,3,5,7-tetravinylcyclotetrasiloxane (TTCS) precursor with 1 wt. % dicumyl peroxide added as the cross-linking agent. The resulting polymer can then be milled into a powder and pyrolyzed at temperatures greater than 900° C., for example.

Graphene oxide may be prepared from graphite according to a number of chemical oxidation methods known in the art. However, a high-yield of graphene oxide can be achieved by treating graphite with a strong acid. In particular, the graphene oxide may be prepared by adding a strong acid such as sulfuric acid and an oxidizing agent such as potassium permanganate to graphite, heating the mixture to induce a reaction therebetween, cooling the reaction product to room temperature, and adding an oxidizing agent such as hydrogen peroxide thereto to oxidize the graphite.

In certain embodiments, the composite compositions can be formed by creating homogeneous mixtures of graphene or graphene oxide and the polymer-derived ceramic material. In one particular embodiment, the graphene or graphene oxide and polymer-derived ceramic material can be dispersed in a liquid carrier material. In certain embodiments, the liquid carrier is aqueous and may further comprise an alcohol such as isopropanol. Graphene oxide sheets are readily dispersible in water, whereas graphene and the polymer-derived ceramic material require sonication in order to form a homogeneous dispersion. The liquid carrier is then at least partially removed, such as through a filtering operation, to form a thin composite paper material. Any liquid carrier residues can then be removed from the paper in a subsequent drying operation. The removal of the liquid carrier can result in formation of homogeneously layered nanocomposite paper with the ceramic particles trapped between graphene or graphene oxide layers.

In certain methods according to the present invention, the polymer-derived ceramic material is added to the graphene or graphene oxide dispersion in an amount of at least about 1%, 5%, 10%, 20%, 30%, 40%, 50%, 55%, or 60% by weight based upon the combined dry weight of the graphene or graphene oxide and ceramic materials. In other embodiments, the polymer-derived ceramic material is added to the graphene or graphene oxide dispersion in an amount no more than about 95%, 90%, 80%, 70%, 65%, 60%, 50%, 40%, 35%, or 30% by weight based upon the combined dry weight of the graphene or graphene oxide and ceramic materials. In one or more embodiments, the dispersion can comprise the ceramic particles in an amount ranging from about 1% to about 90%, about 20% to about 85%, about 35% to about 80%, or about 60% to about 75% by weight based upon the combined dry weight of the graphene or graphene oxide and ceramic materials.

In the case of graphene/ceramic composite papers, no further chemical modification of the paper is required, and the paper is ready for use in a desired application, such as construction of an anode for a battery. However, in the case of graphene oxide/ceramic composite papers, the paper is essentially a precursor material that is not suitable for use as an electrode given the poor conductivity of graphene oxide. Therefore, the graphene oxide of this composite must be reduced. Reduction of in construction of the graphene oxide must be reduced. Reduction of the graphene oxide into rGO can be achieved through a heat treatment step in which at least a portion of the graphene oxide present in the composite undergoes thermal reduction. In certain embodiments, the thermal reduction of graphene oxide can be achieved by heating the graphene oxide/ceramic paper at a temperature of at least 400° C., or between about 400° C. to about 700° C., between about 450° C. to about 600° C., or at about 500° C. for a period of at least 15 minutes, or between about 15 minutes to about 4 hours, between about 45 minutes to about 3 hours, or 2 hours. In is preferable for the thermal reduction to be carried out under an inert atmosphere, such as under argon.

Following filtering and heat treatment, if necessary, the composite material may comprise the polymer-derived ceramic material in an amount of at least about 1%, 5%, 10%, 20%, 30%, 40%, 50%, 55%, or 60% by weight. In other embodiments, the composite material may comprise the polymer-derived ceramic material in an amount no more than about 95%, 90%, 80%, 70%, 65%, 60%, 50%, 40%, 35%, or 30% by weight. In particularly preferred embodiments, the composite material comprises the polymer-derived ceramic material in an amount ranging from about 1% to about 90%, about 20% to about 85%, about 35% to about 80%, or about 60% to about 75% by weight. In various embodiments, the composite material can comprise graphene or rGO in an amount ranging from about 5% to about 50%, about 10% to about 40%, or about 15% to about 30% by weight.

In one or more embodiments the composite material can include the ceramic particles positioned between flat, sheet-like layers of the graphene or rGO material, thereby forming a composite paper. In various embodiments, the composite paper can have a thickness ranging from about 1 µm to about 300 µm, about 5 µm to about 250 or about 10 µm to about 200 µm. In certain embodiments, a composite paper having a diameter of approximately 14.3 mm can have a weight of about 8 mg to about 30 mg, about 10 mg to about 25 mg, about 13 mg to about 22 mg, or about 15 mg to about 20 mg. Thus, the composite material may have a density of between about 1 $g/cm^3$ to about 25 $g/cm^3$, between about 1.5 $g/cm^3$ to about 10 $g/cm^3$, or about 2 $g/cm^3$ to about 5 $g/cm^3$.

The composite compositions according to the present invention may comprise particles of a polymer-derived ceramic material supported on graphene or rGO. The ceramic material may also be homogeneously dispersed within layers of graphene or rGO. Further yet, the ceramic particles may be intercalated between two or more sheets comprising graphene or rGO. In certain embodiments, the composite material comprises a well-organized, interleaved free-standing paper that can be utilized in constructing an electrode, especially in construction of a battery. Graphene and rGO, with their large surface areas, can serve as the host material to the semiconducting polymer-derived ceramic particles between their layers, providing the necessary electronic path and consistent performance at high current densities, and structural stability. The polymer-derived ceramic material particles can offer the required chemical and thermodynamic stability, along with high Li intercalation capacity for the anode. In the composite materials, graphene and rGO can serve as effective current collectors and electron conductors with a stable chemical and mechanical structure. Thus, in certain embodiments according to the present invention, this flexible freestanding composite paper does not include the copper current collector typically used in a LIB anode. In one or more embodiments, an LIB anode comprising the composite paper does not include a conductive polymeric binder, such as polyvinyl alcohol, or a conducting agent, such as carbon black, or various solvents, such as N-methyl-2-pyrrolidone, as might be found in traditional LIB anodes.

Figure 1:
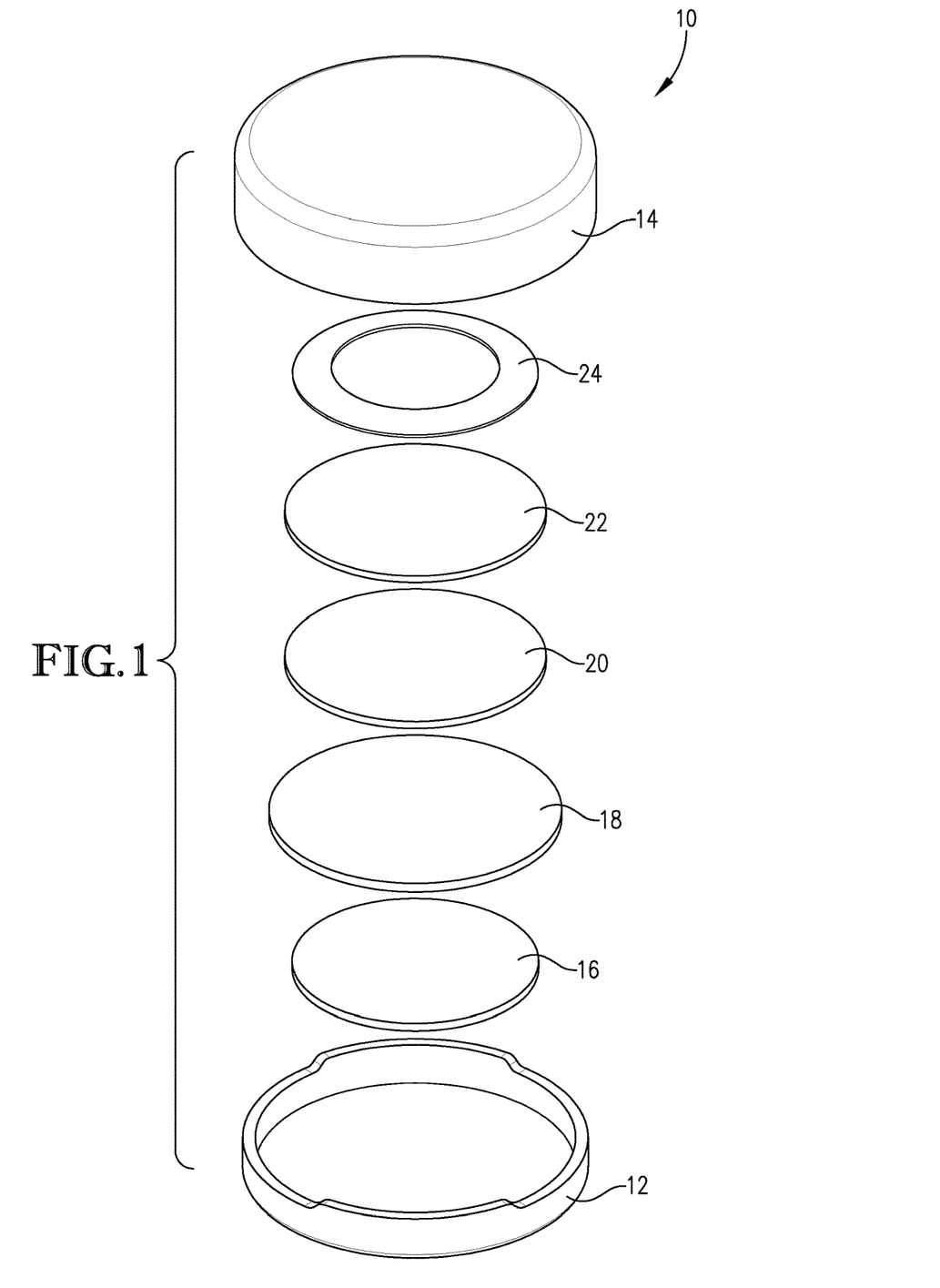
FIG. 1 is a schematic of a coin cell comprising a composite anode according to one embodiment of the present invention.

FIG. 1 illustrates an exemplary battery 10 constructed utilizing the composite material according to the present invention. In preferred embodiments, battery 10 comprises an LIB. Battery 10 is depicted as a coin cell; however, this depiction is only exemplary. It is within the scope of the present invention for the batter to assume any size or shape, including a cylindrical cell, and may be used for personal electronics, vehicle batters, or aircraft batteries, for example. Battery 10 generally comprises an outer case 12 and an outer cap 14. A composite anode 16 made in accordance with the present invention is provided in contact with case 12. A separator material 18 is disposed over anode 16 separating it from the other internal battery components. Separator material 18 generally comprises a porous, and preferably fibrous, material such as fiberglass or polypropylene. However, any material known to those of skill in the art, including woven and nonwoven fibrous materials, may be employed. A reference electrode 20, such as lithium foil, is located against a face of separator material 18 opposite of anode 16. A spacer 22 and spring 24 are provided to compress the internal battery components together upon assembly of battery 10. Battery 10 may also comprise an electrolyte material, such as a lithium salt in an organic solvent. Exemplary non-aqueous electrolytes for use in lithium ion batteries include mixtures of organic carbonates, such as ethylene carbonate or diethylene carbonate, and complexes of lithium ions. These electrolytes can comprise non-coordinating anion salts such as lithium hexafluorphosphate, lithium hexafluororarsenate monohydrate, lithium perchlorate, lithium tetrafluororborate, and lithium trifluoromethanesulfonate.

In various embodiments, the polymer-derived ceramic material is capable of actively cycling lithium ions. In one or more embodiments, the composite electrode can exhibit a stable charge capacity (anode) of from about 400 to about 600 $mAhg^{-1}$, about 475 to about 575 $mAhg^{-1}$, or about 500 to about 550 $mAhg^{-1}$ at current densities up to 2400 $mAg^{-1}$, with at or about 100% efficiency, considering the total anode weight. In a preferred embodiment, the composite electrode can exhibit a stable charge capacity (anode) of at or about 543 $mAhg^{-1}$ at current densities up to 2400 $mAg^{-1}$ with at or about 100% efficiency, considering the total anode weight. In one or more embodiments, at a current density of 1600 $mAg^{-1}$ with symmetric cycling, an anode comprising a composite paper made in accordance with the present invention can exhibit stable charge capacity of at or about 200 $mAhg^{-1}$ after 1000 cycles, with at or about 100% efficiency.

In various embodiments, the LIB composite anode can comprise a composite paper having a maximum diameter ranging from about 1 mm to about 100 mm, about 5 mm to about 80 mm, or about 10 mm to about 70 mm. In certain other embodiments, the composite paper can have a maximum diameter of at least about 5 mm, about 10 mm, about 50 mm, about 100 mm, or about 500 mm. It should be understood that these ranges and values of the size of the composite paper are non-limiting, and that larger or smaller composite papers are also contemplated by this invention. Further, it should be understood that the maximum diameter refers to a straight line extending from one point on the edge of the composite paper to another point on the edge of the composite paper passing through the center point, and does not necessarily require the composite paper to be circular or cylindrical in shape.

EXAMPLE

This Example describes a process for preparing an rGO/SiOC composite material, and characterization of the composite material, in accordance with one embodiment of the present invention. It is to be understood, however, that this Example is provided by way of illustration and nothing therein should be taken as a limitation upon the overall scope of the invention.

Materials and Instrumentation

Sodium nitrate (99.2%), potassium permanganate (99.4%), sulfuric acid (96.4%), hydrogen peroxide (31.3% solution in water), hydrochloric acid (30% solution in water), methanol (99.9%) were obtained from Fisher Scientific. All materials were used as received without further purification.

Scanning electron microscopy (SEM) of the synthesized material was carried out on a Carl Zeiss EVO MA10 system with incident voltage of 5 KV to 30 KV. TEM images were digitally acquired by use of a Phillips CM100 operated at 100 KV. Material characterization was made using X-ray diffractometer (XRD) operating at room temperature, with nickel-filtered CuKα radiation ($\lambda$=1.5418 Å). Thermogravimetric analysis (TGA) was performed using Shimadzu 50 TGA (limited to 800° C.). Samples weighing, ~2.5 mg, were heated in a platinum pan at a rate of 10° C./min in air flowing at 20 mL/min.

Preparation Graphene Oxide

Modified Hummer's method was used to make graphene oxide. This method is described in detail in Marcano et al., Improved Synthesis of Graphene Oxide, ACS Nano 2010, 4, 4806-4814. Concentrated $H_2SO_4$ (130 mL) was added to a mixture of graphite flakes (3 g) and $NaNO_3$ (1.5 g). The mixture was cooled down using an ice bath. $KMnO_4$ was added slowly to this mixture. The mixture was stirred for 12 hours at 50° C. Then it was quenched with water (400 mL) with 30% $H_2O_2$ (3 mL) while in an ice bath such that the temperature did not go beyond 20° C. The remaining material was then washed in succession with 200 mL of water twice, 200 mL of 30% HCl and 200 mL of ethanol. The material remaining after these extended washes was coagulated with 200 mL of ether and filtered through a paper filter. The filtrate was dried overnight to obtain dry graphene oxide (GO).

Preparation of Polymer-Derived SiOC Ceramic

SiOC was prepared through the polymer pyrolysis route from liquid 1,3,5,7-tetramethyl-1,3,5,7-tetravinylcyclotetrasiloxane (TTCS, Gelest, Pa.) precursor with 1 wt. % dicumyl peroxide added as the cross-linking agent. The mixture was cross-linked at 380° C. in argon at 5° C. min-1 for 5 h, which resulted in a white infusible mass. The infusible polymer was ball-milled in to fine powder and pyrolyzed at 1100° C. for 5 h in flowing argon resulting in a fine black SiOC ceramic powder.

Preparation of Reduced Graphene Oxide and SiOC Composite Paper 20 mL colloidal suspension of GO in 1:1 (v/v) water and isopropanol was made by sonication for 10 minutes. To this solution weight percent of SiOC particles (with respect to GO) were added and the solution was further sonicated for 60 minutes and stirred for 6 h for homogenous mixing. The composite suspension was then filtered by vacuum filtration though a 10 µm filter membrane (HPLC grade, Millipore). The GO/SiOC composite paper obtained was carefully removed from the filter paper and dried. This dry paper then underwent thermal reduction at 500° C. under argon atmosphere for 2 h. The heat-treated paper was then punched into small circles and was used as anode material for LIB coin cells. The samples were labeled as rGO, 10SiOC, 40SiOC, 60SiOC and 80SiOC for pristine rGO paper and rGO with 10, 40, 60 and 80% of SiOC in SiOC-GO paper, respectively. These composite papers were then punched in to circles of size 14.3 mm diameter for use as battery anodes.

Coin Cell/Battery Assembly

Li-ion battery coin cells were assembled in an argon-filled glove box. 1M $LiPF_6$ (Alfa Aesar) in (1:1 v/v) dimethyl carbonate:ethylene carbonate (ionic conductivity 10.7 mS $cm^{-1}$) was used as the electrolyte. A 25 µm thick (19 mm diameter) glass separator soaked in electrolyte was placed between the anode (working electrode) and pure lithium foil (14.3 mm diameter, 75 µm thick) as the counter electrode. A washer, a spring, and a top casing were placed on top to complete the assembly before crimping.

Electrochemical performance of the assembled coin cells was tested using a multi-channel BT2000 Arbin test unit sweeping between 2.5 V to 10 mV vs $Li/Li^+$ using following cycle schedule: (a) Asymmteric mode: Li+ was inserted at 100 $mAg^{-1}$, while the extraction was performed at increasing current densities of 100, 200, 400, 800, 1600, and 2400 $mAg^{-1}$ for 5 cycles each, and returning back to 100 $mAg^{-1}$ for the next 10 cycles. While for the 40SiOC cell the test schedule was slightly different, 20 cycles were performed at 2400 $mAg^{-1}$, ending with 23 cycles at 100 $mAg^{-1}$ during charge half cycle; (b) Symmetric mode: Later, all the cells were subjected to symmetric cycling at a current density of 1600 $mAg^{-1}$ for up to 1000 cycles, returning back to 100 $mAg^{-1}$ for the last 10 cycles.

Results and Discussions

Figures 2A, 2F:
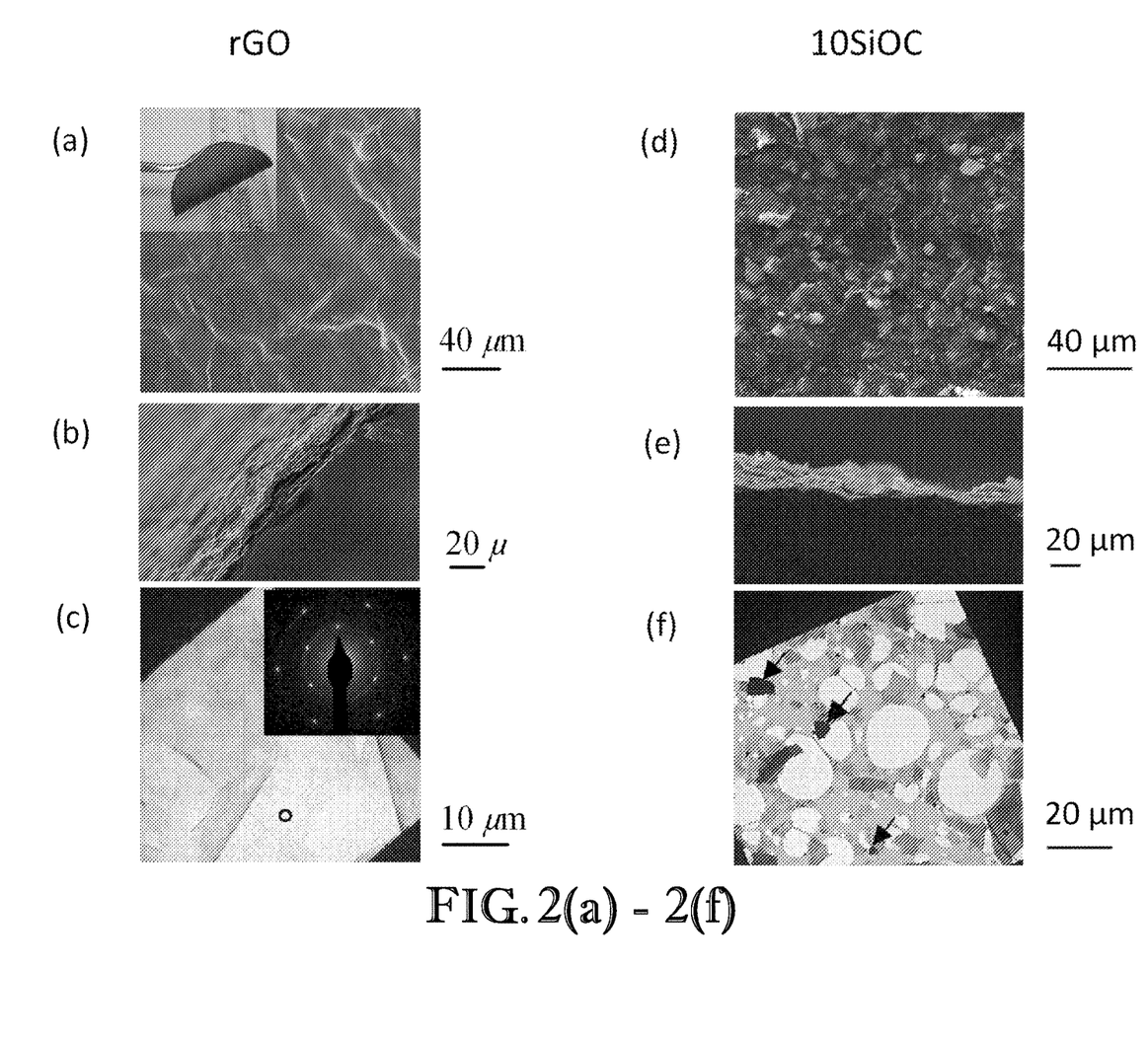
Figures 2G, 2L:
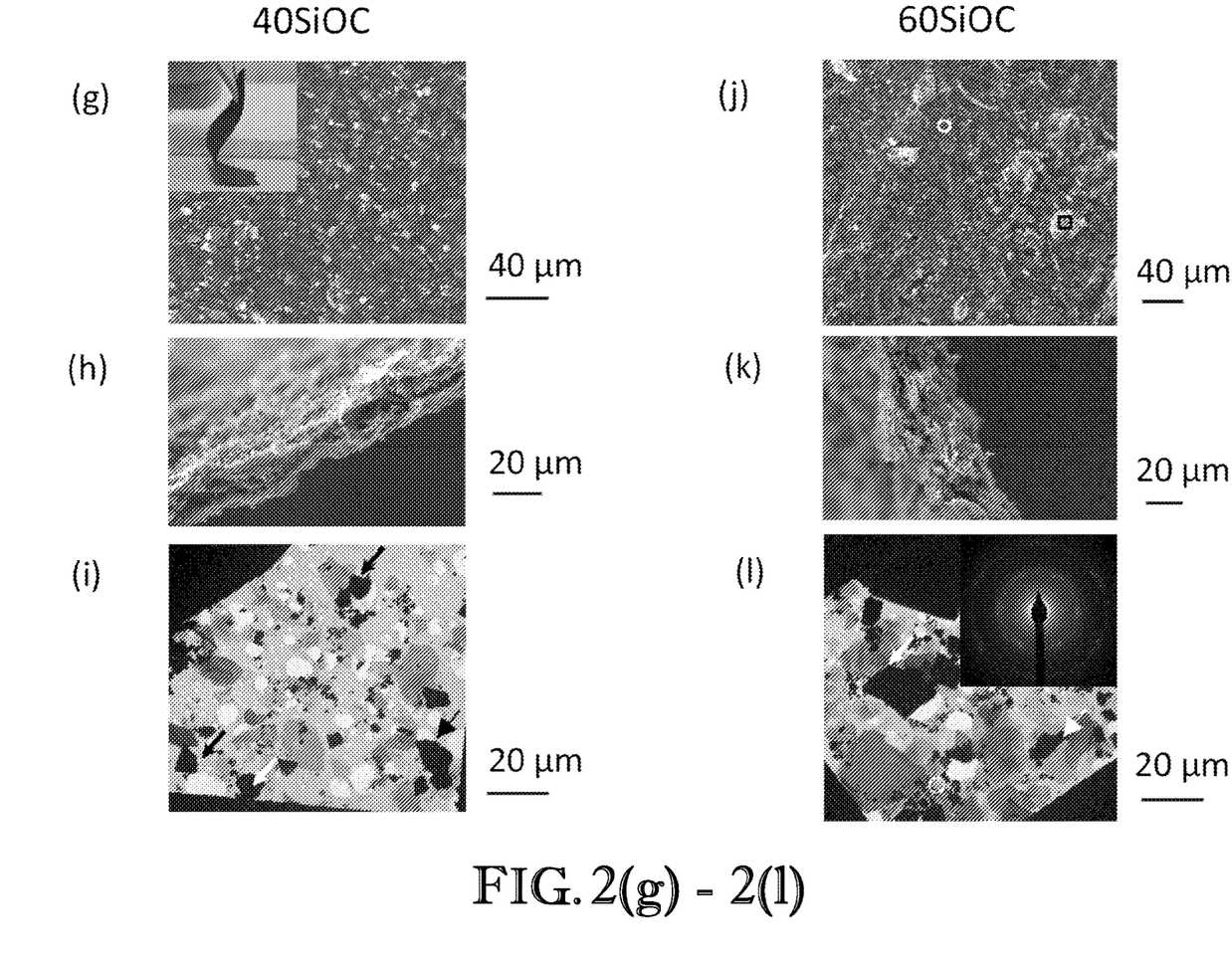

The microstructure of the composite paper was characterized by electron microscopy. The scanning electron microscopy (SEM) image of rGO paper in FIG. 2a shows a sheet like structure with smooth surface, and the cross sectional image in FIG. 2b shows that the rGO was tightly packed together. SEM images taken of crosslinked TTCS and SiOC particles suggests average particle size to be approximately (1 to 5) µm. SEM images of rGO/SiOC composite papers with 10, 40, 60 wt. % of SiOC in GO are shown in FIGS. 2(d), (g), and (j), respectively. The thickness of the composite papers increased with increasing SiOC loading, from approximately 10 µm for 10 SiOC to 100 µm for 60 SiOC. See, FIGS. 2(e), (h), and (k). Well-ordered stacks of rGO were clearly seen with SiOC particles interlayered between rGO sheets. The inserts in FIGS. 2(a) and (g) are digital photographs which confirm the outstanding structural flexibility of the corresponding rGO and rGO/SiOC papers. Similar to the SEM images, the increasing percentage of SiOC and their uniform distribution was also noticed in the transmission electron microscopy images. See, FIGS. 2(c), (f), (i) and (l). The GO/SiOC TEM images showed large thin rGO sheets along with small SiOC particles. The rGO sheets seem to fold and cover the individual SiOC particle in few instances and other instances show GO being interlayered by SiOC. The hexagonal spot pattern (the insert of FIG. 2(c)) indicates that the graphitic AB stacking is preserved in the lattice after thermal reduction. In the case of selected area electron diffraction (SAED) pattern shown in the inset of FIG. 2(l), the multiple spot pattern is due to the polycrystallinity of restacked rGO sheets while the faint ring pattern is attributed to the amorphous SiOC material. From these images it is observed that because graphene sheets are larger in volume than SiOC particles for the same percentage of weight, well-dispersed rGO sheets (during the layer-by-layer filtration process) could arrange themselves around the SiOC particles in an orderly manner so as to form a strong and flexible composite paper. The SEM and TEM images further establish that the morphology of the composite paper is planar and porous. This structure can result in easier and faster diffusibility of Li-ions in SiOC active phases.

Further analysis involved SEM-X-ray energy dispersive spectroscopy of the 60SiOC composite paper. The EDX spectra from the circled area in FIG. 2(j) showed peaks at 0.27 KeV and 0.52 KeV, which correspond to carbon (90 wt. %) and oxygen (10 wt. %) Kα energy, respectively. The low oxygen content indicated that rGO was highly reduced and pristine. From the squared area in FIG. 2(j) in addition to carbon and oxygen peaks, another peak at 1.75 KeV, which corresponds to silicon Kα energy, was also observed. The particle had a composition of 17 wt. % silicon, 46 wt. % oxygen and 37 wt. % carbon, which unambiguously confirmed the presence of SiOC.

The complete reduction of GO (non-conducting) to rGO (conducting) was confirmed by use of X-ray diffraction (XRD). Both GO and GO/SiOC papers showed peaks at 11.05 and 9.8°, which correspond to an interlayer spacing of 8 and 12 Å, respectively. The spacing is very large compared with that of graphite (which has its major peak (002) at 26.53°, corresponding to 3.36 Å), because of oxygen functional groups present in GO as well as water molecules held between the layers. On annealing at 500° C. for 2 h, the paper showed a broad peak at 2θ=26°, which is typical of reduced graphene oxide. The broad peak observed in the spectra indicates that the spacing between the layers is not homogeneous. The XRD spectra of cross-linked TTCS and SiOC particles were both featureless, confirming the amorphous nature of these ceramics (a hallmark of these materials).

Thermogravimetric analysis (TGA) analysis was performed in order to ascertain the amount of ceramic present in the rGO/SiOC composite papers. After heat treatment, due to the weight loss by GO, the ratio of SiOC material present in the composite increases depending on the percentage of GO originally present in the papers. The SiOC content in 10SiOC, 40SiOC, 60SiOC and 80SiOC increased from 10 to 30%, 50 to 65%, 65 to 78% and 83 to 92%, respectively. In the traditional method of anode preparation, the active material is mixed with binder and conductive agent in a 80:10:10 ratio. But through this method a free-standing and light weight anode was made comprising 72% SiOC as the active material and 22% of rGO as both binder and conductive agent.

Charge/discharge curves and differential capacity curves for rGO and rGO/SiOC with varying SiOC content were plotted (not shown). The voltage profiles were prepared for the $1^{st}$, $2^{nd}$ and $1010^{th}$ cycles. The differential capacity profiles for rGO were found to be similar to those reported in the literature, with a primary reduction peak at 50 mV, a secondary reduction peak at 750 mV and an oxidation peak at 133 mV. The peak at 50 mV, which was found to be present in all subsequent cycles, was associated with lithiation of rGO while the peak at 750 mV signified formation of a secondary electrolyte interphase (SEI), which exists only in the first cycle. With respect to the 10SiOC material, in the first cycle three reduction peaks were observed at around 50 mV, 250 mV and 600 mV, which were attributed to rGO lithiation, $Li_xSiOC$ formation and SEI formation, respectively. In contrast only one subtle anodic peak at 100 mV is observed, which represented rGO de-lithiation with an extended bulge at around 600 mV representing $Li_xSiOC$ de-lithiation. As the percentage of SiOC increased to 40 and 60% the domination of SiOC lithiation was observed to increase, which is evidently seen with increase in intensity of the $Li_xSiOC$ formation peak at around 600 mV in the first cycle when compared to the rGO lithiation peak at 50 mV. Also, rGO de-lithiation peak intensity at 100 mV was diminished with respect to the $Li_xSiOC$ de-lithiation peak. It was also noticed that the $2^{nd}$ and the $1010^{th}$ cycle in the charge/discharge and differential capacity curves of rGO paper and all the rGO composite papers had similar profiles, which showed that no new phases were formed even after cycling for more than 1000 cycles at 1600 $mAg^{-1}$.

The charge capacities and columbic efficiency of rGO, 10SiOC, 40SiOC, 60SiOC anodes cycled at varying current densities was determined. For rGO it was observed that the first cycle charge capacity at 100 $mAg^{-1}$ was ~210 $mAhg^{-1}$ and then dropped to ~200 $mAhg^{-1}$ in the second cycle which then stabilized at around 180 $mAhg^{-1}$ after 5 cycles. When the current density was increased to 2400 $mAg^{-1}$ the charge capacity was retained at ~175 $mAhg^{-1}$. Bringing the current density back to 100 $mAg^{-1}$ led to the return of higher capacity of 192 $mAhg^{-1}$. The high irreversible first cycle capacity results from an electrochemical reaction contributing to solid-electrolyte interphase (SEI) layer formation. In the case of the rGO/SiOC composites, the first cycle charge capacity increased corresponding to the percentage of SiOC present in the mixture i.e., 10SiOC showed 376 $mAhg^{-1}$ while 40SiOC and 60SiOC showed electrochemical capacities of at least 488 $mAhg^{-1}$ and 702 $mAhg^{-1}$, respectively. The 60SiOC had 97% of the theoretical capacity of the composite material (theoretical capacity graphite-372 $mAhg^{-1}$ and highest reported reversible capacity of SiOC-958 $mAhg^{-1}$). When current density was increased to 2400 $mAg^{-1}$, similar to the rGO anode, the composites 10SiOC, 40SiOC and 60SiOC retained the reversible capacity at 296, 343 and 543 $mAhg^{-1}$, respectively. The capacity retention at 2400 $mAg^{-1}$ was at least 83.5% and first cycle efficiency was at least 68% for 60SiOC specimen, which was the highest reported performance for any free-standing graphene based anode (see, Table 2). Reducing the current density again to 100 $mAg^{-1}$, the charge capacity increased to 304 $mAhg^{-1}$ (80.85% retained), 418 $mAhg^{-1}$ (85.66% retained) and 626 $mAhg^{-1}$ (97% retained) for 10SiOC, 40SiOC and 60SiOC, respectively. A summary of electrochemical data is provided in Table 1. The resistance values in the table indicate that even with 60 wt. % of SiOC the resistance of composite paper (60Ω) was only marginally higher than rGO paper (40Ω). Also, the efficiency of 60SiOC remained at ~100% throughout the cycling test. In the 80SiOC anode the first cycle charge capacity was ~762 $mAhg^{-1}$. A plot of differential capacity (not shown) for the first cycle showed domination of $Li_xSiOC$ lithiation and delithiation peaks than rGO peaks, which is in trend with other samples. The 80SiOC anode started to show random charge capacity with increasing cycle number suggesting disintegration of the composite paper.

TABLE 1

| Material | Resistance, Ω | First cycle charge capacity, mAh · g$^{-1}$ | First cycle efficiency, % | Charge capacity at n$^{th}$ cycle, mAh · g$^{-1}$ | Efficiency at n$^{th}$ cycle, % |
|---|---|---|---|---|---|
| rGO | 40 | 210 | 39 | 192 (40) | 96.3 (40) |
| 10SiOC | 40 | 376 | 44.6 | 304 (40) | 82 (40) |
| 40SiOC | 50 | 488 | 51.4 | 148 (48) | 99.56 (48) |
| 60SiOC | 60 | 702 | 68 | 626 (40) | 99.6 (40) |
| 80SiOC | 150 | 762 | 68.5 | 683 (32) | 99.2 (32) |

A number of other free-standing graphene hybrid papers were tested and compared to the rGO/SiOC papers made according to the present example. A summary of electrochemical data for these other papers in comparison with that of the 60SiOC material is provided in Table 2.

TABLE 2

| Free-standing anode material | First cycle charge capacity, mAh · g$^{-1}$ | First cycle efficiency, % | Current density, mA · g$^{-1}$ | Reversible capacity (cycle number), mAh · g$^{-1}$ |
|---|---|---|---|---|
| 60SiOC | 702 | 68 (>99% thereafter) | 100 2400 | 626 (40) 543 |
| Graphene paper | 75 | 11 | 50 | 84 (2) |
| rGO-Ar-III (Holey graphene) | 403 | 49 | 50 2000 | 403 (10) 178 |
| Si/Graphene | 800 | 36 | 50 | 708 (100) |
| Si nanowire/ Graphene | 600 | 52 | 50 | 500 (20) |
| TiO$_2$/Graphene | 250 | 62 | 200 2000 4000 | 175 (100) 122 (60) 100 (80) |
| MnO$_2$ nano- | 700 | 53 | 100 | 495 (40) |

TABLE 2-continued

| Free-standing anode material | First cycle charge capacity, mAh·g$^{-1}$ | First cycle efficiency, % | Current density, mA·g$^{-1}$ | Reversible capacity (cycle number), mAh·g$^{-1}$ |
|---|---|---|---|---|
| tube/Graphene | | | 1600 | 208 |
| SnO$_2$/Graphene | 700 | 28 | 100 | 438 (50) |
| SnO$_2$/Graphene/CNT | 810 | 52 | 250 | 635 (80) |
| | 400 | 40 | 1000 | 400 (50) |
| SnO$_2$/Graphene | 600 | 48 | 250 | 600 (10) |
| | | | 1000 | 390 |

To test the cyclic stability of the anodes, the batteries were subjected to symmetric cycling at a current density of 1600 mAg$^{-1}$. The charge capacity for each anode (rGO, 10SiOC, 40SiOC, and 60SiOC) was plotted (not shown), and from the plot it was observed that the three of the four cells showed virtually no capacity fading for 1000 cycles. The efficiency was ~100%. The charge capacity of 40SiOC anode was the highest at approximately 160 mAhg$^{-1}$ after 1000 cycles, while 60SiOC and 10SiOC papers were slightly lower at approximately 139 and 115 mAhg$^{-1}$, respectively. The charge capacity of 60SiOC continued to show some decline as the cells were subjected to prolonged cycling at 1600 mAg$^{-1}$, which was not observed in other composite specimens. This data tends to shows the importance of graphene in the composite material. The capacities of composite papers were much higher when compared to the capacity of just rGO, which was approximately 58 mAhg$^{-1}$. Most significantly the cells regained their original capacity of ~185, 310, 371 and 568 at 1010$^{th}$ cycle when the current density was brought down to 100 mAg$^{-1}$, while the efficiency was ~100%. This data shows that even after 1020 cycles the anode was robust and continued to function without any appreciable degradation.

To check the integrity of the anodes, the cells were dissembled in their lithiated state and the anodes recovered for further characterization. Under SEM imaging, no evidence of surface cracks, volume change or physical imperfections were observed, suggesting the mechanical/structural strength of the rGO/SiOC composite paper. In all cases, the evidence of SEI formation due to repeated cycling of Li ions could be observed. The 80SiOC anode had surface cracks suggesting structural damage, which explained the erratic behavior of the cell during cycling.

The composite paper has an open structure which is an advantage for three reasons: (1) it can intercalate/deintercalate lithium faster, (2) it can easily accommodate the volume expansion created by the insertion of the Li-ions without causing much stress on the structure of the composite, and (3) owing to the open structure of the anode, the SiOC particles present in the composite have better access to the incoming Li-ions, which is not present in anodes made in the traditional method of applying material onto a current collector. Because of these reasons the charge capacity does not drop even at high current densities. Thus, exceptional cyclic stability of the composite is attributed to rGO and the high capacity to SiOC particles. In this example, the rGO acted as a structural element to support the SiOC particles and provide a highly conducting network for electron transfer.

This example demonstrates the synthesis of a freestanding multi-component composite paper comprising high-temperature SiOC amorphous glass-ceramic particles supported in rGO matrix as a stable and durable battery anode. The porous 3-D rGO matrix can serve as an effective current collector and electron conductor with a stable chemical and mechanical structure while, the embedded amorphous SiOC particles actively cycled Li-ions with high efficiency. Owing to this unique morphology, the rGO/SiOC composite electrode can exhibit a stable charge capacity (anode) of at least 543 mAhg$^{-1}$ at current densities up to 2400 mAg$^{-1}$ with ~100% efficiency. Moreover, at current density of 1600 mAg$^{-1}$ with symmetric cycling the anode can exhibit a stable charge capacity of at least 200 mAhg$^{-1}$ after 1000 cycles again with ~100% efficiency. Post-cycle imaging of the disassembled cell revealed a completely integral electrode explaining the stable electrochemical performance. Elimination of inactive ingredients like a heavy metal current collector, non-conducting polymeric binder and conducting agent can reduce the total electrode weight and, thus, provides the means to produce highly efficient light weight batteries.

We claim:

1. A composition comprising a plurality of stacked sheets of graphene or reduced graphene oxide and particles of a polymer-derived ceramic material supported by said sheets, wherein said stacked sheets are external to said particles, wherein said composition is in the form of a free-standing paper material, and wherein said polymer-derived ceramic material comprises a member selected from the group consisting of SiOC, SiCN, SiBCN, SiBCO, SiAlCN, and combinations thereof and is present in said composition at a level of between about 70% to about 90% by weight.

2. The composition according to claim 1, wherein said polymer-derived ceramic material comprises SiOC.

3. The composition according to claim 1, wherein said composition comprises particles of said polymer-derived ceramic material homogeneously dispersed within layers of said graphene or reduced graphene oxide.

4. The composition according to claim 1, wherein said composition comprises particles of said ceramic material intercalated between two or more of said sheets of graphene or reduced graphene oxide.

5. The composition according to claim 1, wherein said graphene or reduced graphene oxide is present in said composition at a level of between about 5% to about 50% by weight.

6. The composition according to claim 1, wherein said sheets are larger in volume than said particles of said polymer-derived ceramic material on a per weight basis and are arranged around said particles so as to form a flexible composite paper.

7. A composite electrode comprising the composition according to claim 1.

8. The composite electrode according to claim 7, wherein said electrode does not include a separate current collector.

9. The composite electrode according to claim 7, wherein said electrode does not include a conductive polymeric binder or conducting agent.

10. The composite electrode according to claim 7, wherein said electrode is an anode.

11. The composite electrode according to claim 10, wherein said anode exhibits a stable charge capacity of between about 400 to about 600 mAhg$^{-1}$.

12. The composite electrode according to claim 7, wherein said electrode is circular and has a diameter of between about 1 mm to about 100 mm.

13. A battery comprising the electrode according to claim 7.

14. The battery according to claim 13, wherein said battery is a lithium ion battery.

15. The battery according to claim 13, wherein said battery comprises a coin cell battery.

16. The battery according to claim 13, wherein said battery comprises a cylindrical cell battery.

17. The battery according to claim 13, wherein said battery comprises said electrode separated from a counter-electrode a porous separator material.

18. The battery according to claim 13, wherein said battery comprises an electrolyte.

19. A process for producing a composition comprising a plurality of stacked sheets of graphene or reduced graphene oxide and particles of a polymer-derived ceramic material, said process comprising:
(a) mixing graphene sheets with particles of a polymer-derived ceramic material, wherein said sheets are external to said particles; or
(b) (i) mixing sheets of graphene oxide with particles of said polymer-derived ceramic material to form a composition precursor material, wherein said sheets are external to said particles; and
(ii) heat treating said composition precursor material in order to thermally reduce at least a portion of said graphene oxide contained therein to form said composition,
wherein said composition is in the form of a free-standing paper material, and wherein said polymer-derived ceramic material comprises a member selected from the group consisting of SiOC, SiCN, SiBCN, SiBCO, SiAlCN, and combinations thereof and is present in said composition at a level of between about 70% to about 90% by weight.

20. The process according to claim 19, wherein said graphene oxide sheets are produced through chemical oxidation of graphite particles.

21. The process according to claim 19, wherein said polymer-derived ceramic comprises SiOC.

22. The process according to claim 19, wherein (a) comprises dispersing said graphene sheets and said polymer-derived ceramic material particles in a liquid carrier to create a graphene/ceramic dispersion, and subsequently, removing at least a portion of said liquid carrier to form a graphene/ceramic paper.

23. The process according to claim 19, wherein (b) comprises dispersing said graphene oxide sheets and said polymer-derived ceramic material particles in a liquid carrier to create a graphene oxide/ceramic dispersion, and subsequently, removing at least a portion of said liquid carrier to form said composition precursor material.

24. The process according to claim 23, wherein said liquid carrier is comprises a mixture of water and an alcohol.

25. The process according to claim 23, wherein at least a portion of said liquid carrier is removed by filtration.

26. The process according to claim 19, wherein said composition precursor material comprises a graphene oxide/ceramic paper.

27. The process according to claim 26, wherein step (b)(ii) comprises heating said graphene oxide/ceramic paper at a temperature of at least 400° C. for a period of at least 15 minutes.

* * * * *